United States Patent
Miao et al.

(10) Patent No.: US 10,080,230 B2
(45) Date of Patent: Sep. 18, 2018

(54) PORT SELECTION IN COMBINED CELL OF RADIO ACCESS NETWORK

(71) Applicant: Telefonaktiebolaget LM Ericsson (publ), Stockholm (SE)

(72) Inventors: Qingyu Miao, Beijing (CN); Yi-Pin Eric Wang, Fremont, CA (US); Jan Christoffersson, Luleå (SE); Erik Larsson, Uppsala (SE); Per Skillermark, Årsta (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 204 days.

(21) Appl. No.: 15/035,735

(22) PCT Filed: Nov. 11, 2014

(86) PCT No.: PCT/EP2014/003012
§ 371 (c)(1),
(2) Date: May 10, 2016

(87) PCT Pub. No.: WO2015/067376
PCT Pub. Date: May 14, 2015

(65) Prior Publication Data
US 2016/0330745 A1 Nov. 10, 2016

Related U.S. Application Data

(60) Provisional application No. 61/902,513, filed on Nov. 11, 2013.

(51) Int. Cl.
*H04W 72/04* (2009.01)
*H04W 24/02* (2009.01)
(Continued)

(52) U.S. Cl.
CPC ....... *H04W 72/0486* (2013.01); *H04W 24/02* (2013.01); *H04W 24/08* (2013.01); *H04W 72/046* (2013.01); *H04W 88/085* (2013.01)

(58) Field of Classification Search
CPC . H04W 16/10; H04W 88/085; H04W 84/047; H04W 88/00; H04W 28/0205;
(Continued)

(56) References Cited

U.S. PATENT DOCUMENTS

2012/0039320 A1* 2/2012 Lemson ............... H03F 1/3247
370/338
2012/0069880 A1* 3/2012 Lemson ................ H04B 1/18
375/220

(Continued)

FOREIGN PATENT DOCUMENTS

WO   WO 2013/082734 A1   6/2013

OTHER PUBLICATIONS

International Search Report, Application No. PCT/EP2014/003012, dated Mar. 11, 2015.
(Continued)

*Primary Examiner* — Jung Liu
(74) *Attorney, Agent, or Firm* — Sage Patent Group

(57) ABSTRACT

The present invention relates to methods, network nodes and a system for port selection in a cell, particularly in combined cells, of a radio access network. Therein, one or more ports of the radio access network which are to be assigned to a user equipment are selected based on a traffic situation in said cell.

16 Claims, 5 Drawing Sheets

(51) Int. Cl.
*H04W 24/08* (2009.01)
*H04W 88/08* (2009.01)

(58) Field of Classification Search
CPC ......... H04W 72/0486; H04W 72/0453; H04W 24/02; H04B 7/024; H04B 10/25753; H04B 10/02; H04L 47/125; H04L 45/56; H04Q 2011/0081; H04Q 11/0067
See application file for complete search history.

(56) References Cited

U.S. PATENT DOCUMENTS

| | | | | |
|---|---|---|---|---|
| 2012/0149411 A1* | 6/2012 | Miyoshi | ............... | H04B 7/0413 455/501 |
| 2012/0208581 A1* | 8/2012 | Ishida | .................. | H04B 7/0691 455/509 |
| 2012/0214528 A1* | 8/2012 | Hashimoto | .......... | H04B 7/0413 455/509 |
| 2012/0218911 A1* | 8/2012 | Zhu | ........................ | H04B 7/024 370/252 |
| 2013/0236180 A1* | 9/2013 | Kim | .................... | H04J 14/0236 398/72 |
| 2014/0269318 A1* | 9/2014 | Hasarchi | ................ | H04B 7/024 370/235 |

OTHER PUBLICATIONS

Written Opinion of the International Searching Authority, Application No. PCT/EP2014/003012, dated Mar. 11, 2015.
3GPP, Technical Report—"3rd Generation Partnership Project; Technical Specification Group Radio Access Network; Study on UMTS heterogeneous networks (Release 12)", 3GPP TR 25.800 V2.0.0 (Aug. 2013), 130 pp.
Ericsson, "Performance for Legacy UE in Combined Cell", Agenda Item: 5.3.3, Document for: Discussion and Decision, R1-135732, 3GPP TSG RAN WG1 Meeting #75, San Francisco, USA, Nov. 11-15, 2013, 6 pp.
Ericsson, "Link Level Analysis of Spatial Reuse Performance for Legacy UE in Combined Cell", Agenda Item: 5.3.3, Document for: Discussion and Decision, R1-135733, 3GPP TSG RAN WG1 Meeting #75, San Francisco, USA, Nov. 11-15, 2013, 9 pp.
Ericsson, "System Level Analysis of Spatial Reuse Performance for Legacy UE in Combined Cell", Agenda Item: 5.3.3, Document for: Discussion and Decision, R1-135734, 3GPP TSG RAN WG1 Meeting #75, San Francisco, USA, Nov. 11-15, 2013, 7 pp.
Huawei et al., "Proposed SID: Study on UMTS Heterogeneous Networks", Agenda item: 13.2, Document for: Approval, RP-121436, TSG RAN Meeting #57, Chicago, USA, Sep. 4-7, 2012, 5 pp.

* cited by examiner

PORT SELECTION IN COMBINED CELL OF RADIO ACCESS NETWORK

CROSS REFERENCE TO RELATED APPLICATIONS

This application is a 35 U.S.C. § 371 national stage application of PCT International Application No. PCT/EP2014/003012, filed on Nov. 11, 2014, which itself claims the benefit of U.S. provisional Application No. 61/902,513, filed Nov. 11, 2013, the disclosure and content of both of which are incorporated by reference herein in their entireties. The above-referenced PCT International Application was published in the English language as International Publication No. WO 2015/067376 A1 on May 14, 2015.

TECHNICAL FIELD

The present invention relates to methods, network nodes and system for port selection in a cell, particularly in combined cells, of a radio access network.

BACKGROUND

The large uptake of mobile broadband has resulted in significantly increased traffic volumes that need to be handled by the networks (e.g. WCDMA/HSPA). Therefore, techniques that allow cellular operators to manage their network more efficiently are of large importance. Some techniques that may help to improve the downlink performance would be for example 4-branch MIMO, multiflow communication, multi carrier deployment etc. Since the spectral efficiency per link is approaching theoretical limits, one next step may be about improving the spectral efficiency per unit area. In other words, additional features for HSDPA need to provide a uniform user experience anywhere inside a cell by changing the topology of traditional networks. Currently 3GPP is working on this aspect by considering heterogeneous network deployments telecommunication systems, cf. for example 3GPP document RP-121436, "Proposed SID: Study on UMTS Heterogeneous Networks" and 3GPP TR 25.800, "Technical report: Study on UMTS heterogeneous networks", v 2.0.0, August 2013.

Deployment of low-power nodes (LPNs) is seen as a powerful tool to meet the ever-increasing demand for mobile broadband services. A LPN may correspond, for example, to a remote radio unit (RRU), pico, or micro base station, allowing expanding the network capacity in a cost-efficient way. Note that the power transmitted by these LPNs is relatively small compared to that of macro base stations, e.g. 2W as compared 40W for a typical macro base station. A network consisting of traditional macro NodeBs and LPNs is referred to as a heterogeneous network. Two examples of use-cases for heterogeneous network deployment that may be envisioned are coverage holes and capacity enhancement for localized traffic hotspots.

Deployed LPNs in a heterogeneous network are typically classified as either co-channel, meaning that each LPN has its own cell identity (scrambling code). LPNs and Macros are different cells but they typically share the same frequency, or combined cell, meaning that the LPNs have the same cell identities as the Macro cell.

Both types of deployment have their respective advantages and disadvantages. In order to optimize performance in a cell, it is of importance to determine which user equipments in a cell are to be served by which LPN, or more general by which radio unit.

SUMMARY

The aim of the present invention is thus to provide a method and a node for assigning ports of a cell of a radio access network to user equipments.

Accordingly, there is provided a method for assigning ports of a cell of a radio access network to user equipments being attached to this cell, wherein one or more ports to be assigned to a user equipment are selected based on a traffic situation in said cell.

Further, there is provided a network node of a radio access network, comprising a plurality of radio units, a processor and memory, being capable of setting up a cell of the radio access network and assigning said radio units to user equipments being attached to this cell, wherein one or more radio units to be assigned to a user equipment are selected based on a traffic situation in said cell.

Further, there is provided a control node of a radio access network, being capable of determining parameters for selecting ports of a cell of the radio access network to be assigned to user equipments attached to said cell, and of transmitting said parameters to a second network node of the radio access network, wherein said parameters relate to evaluation of a traffic situation in said cell.

Further, there is provided a system for assigning ports of a cell of a radio access network to user equipments being attached to this cell, said system comprising a plurality of ports and being capable of assigning one or more ports to a user equipment, wherein said ports are selected based on a traffic situation in said cell.

In any case, the network node, control node and/or system may be capable or adapted to perform the method as described above and detailed further below.

Further, there is provided a computer program comprising code, which, when executed by one or more processors, causes said processor(s) to perform the above method, and a carrier comprising said computer program code.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
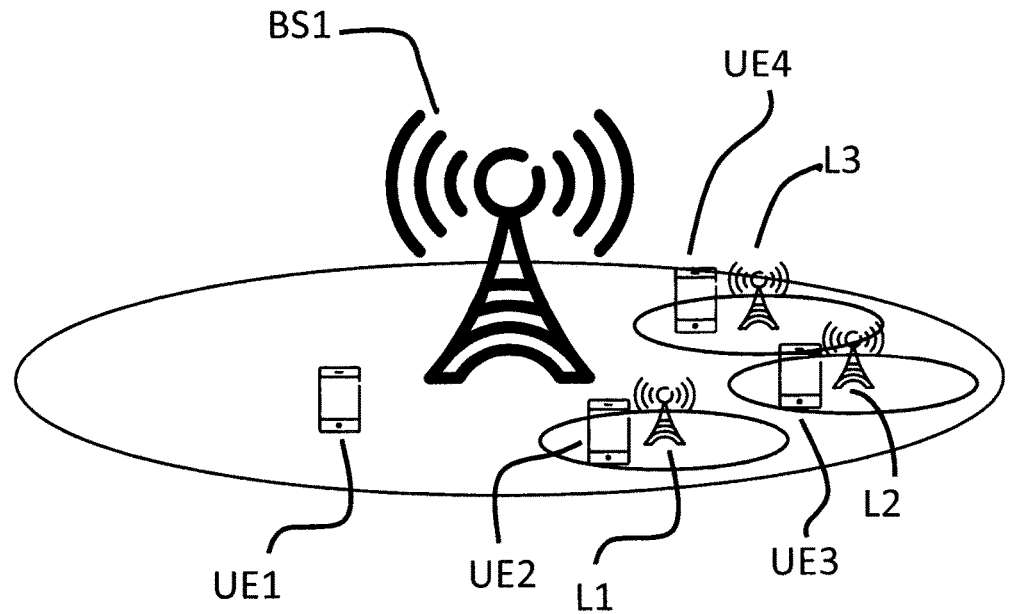
FIG. 1 depicts cell of a radio access network in co-channel operation.

FIG. 1 shows a cell of a radio access network in co-channel operation. The cell comprises a general radio base station BS1, also denoted Macro Base Station, for example a NodeB or eNodeB, and a number of low power nodes (LPN) L1, L2, L3. Each of these nodes creates on own cell, indicated by the ovals around general base station BS1 and LPNs L1, L2, L3, wherein the cell of the general base station BS1 is denoted macro cell and overlaps with the cells created by the low power nodes L1, L2, L3. To each of the thus created cells, user equipments may be attached, depicted in FIG. 1 by exemplary user equipments UE1, UE2, UE3 and UE4

Figure 2:
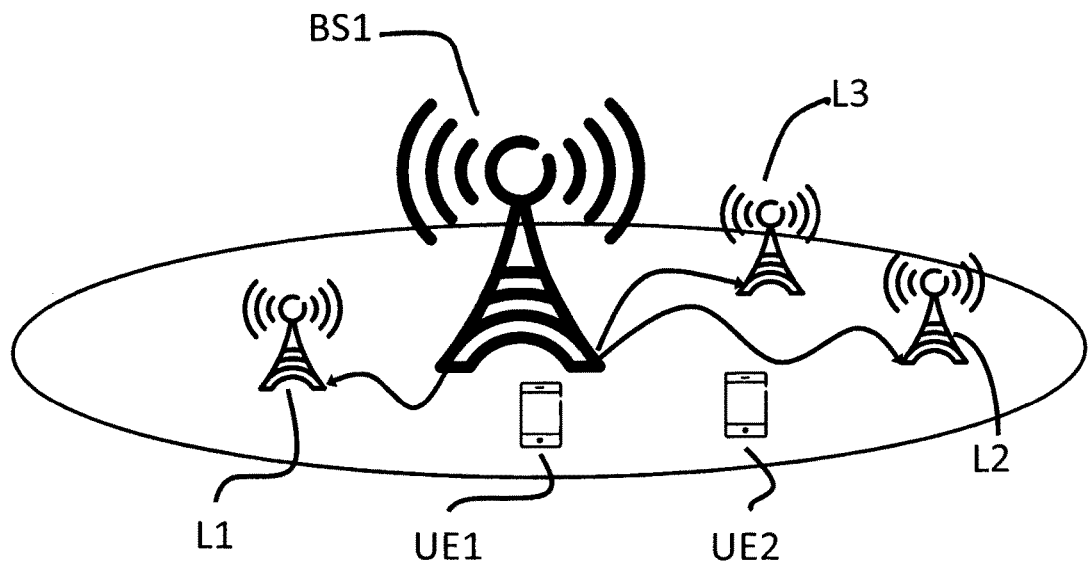
FIG. 2 depicts a cell of a radio access network in combined cell operation.

The fact that each LPN L1, L2, L3 creates a different cell causes some problems related to the co-channel deployment. For example, the different transmit powers of Macro Base Stations and LPNs create an inherent UL/DL imbalance region which affects the interference characteristics in the network and affects the robustness of control channel. Retaining mobility KPIs (Key Performance Indicators) is also much more challenging in this scenario. Furthermore, UEs need to do soft handover when moving from one LPN to macro or to another LPN, or vice versa. Hence, higher layer signalling is needed to perform handover. On the other hand, employing low power nodes in a macro cell in a co-channel fashion offers load balancing (traffic offloading to LPNs), which brings large capacity gain, both average system throughout as well as cell edge user throughput FIG. 2 shows a heterogeneous network where LPNs L1, L2, L3 (e.g. RRUs, or general radio units) are part of the macro cell, i.e. a combined cell. A combined cell can be viewed as a distributed antenna system, and is beneficial in many ways. For example, one transmission antenna can be set up at a main unit BS1, which may be denoted Macro Base Station, while other antennas can be installed as LPNs (RRUs) L1, L2, L3 at other locations and communication between different nodes can employ a fast backhaul. Of course it is also conceivable that there is no macro base station BS1 and radio coverage of the whole cell is accomplished by LPNs L1, L2, L3 alone. In any case, user equipments UE1, UE2 may then be attached to the single, combined cell.

This has many advantages, such as reduced handovers, enhanced mobility handling, possible energy savings and reduced interference provided by better co-ordination between nodes, to mention a few. However compared to the co-channel deployment, the baseline single-frequency network (SFN) combined cell deployment offers small capacity enhancements. To reach a capacity on par with the co-channel deployment, typically additional measures are needed. In particular, node selection needs to be facilitated and demodulation pilots are required. By introducing these functionalities, it is possible to enable spatial-reuse (SR) in a combined cell and thereby achieving capacity equal to, or exceeding, the co-channel, while maintaining the benefits of the SFN combined cell.

Figure 3:
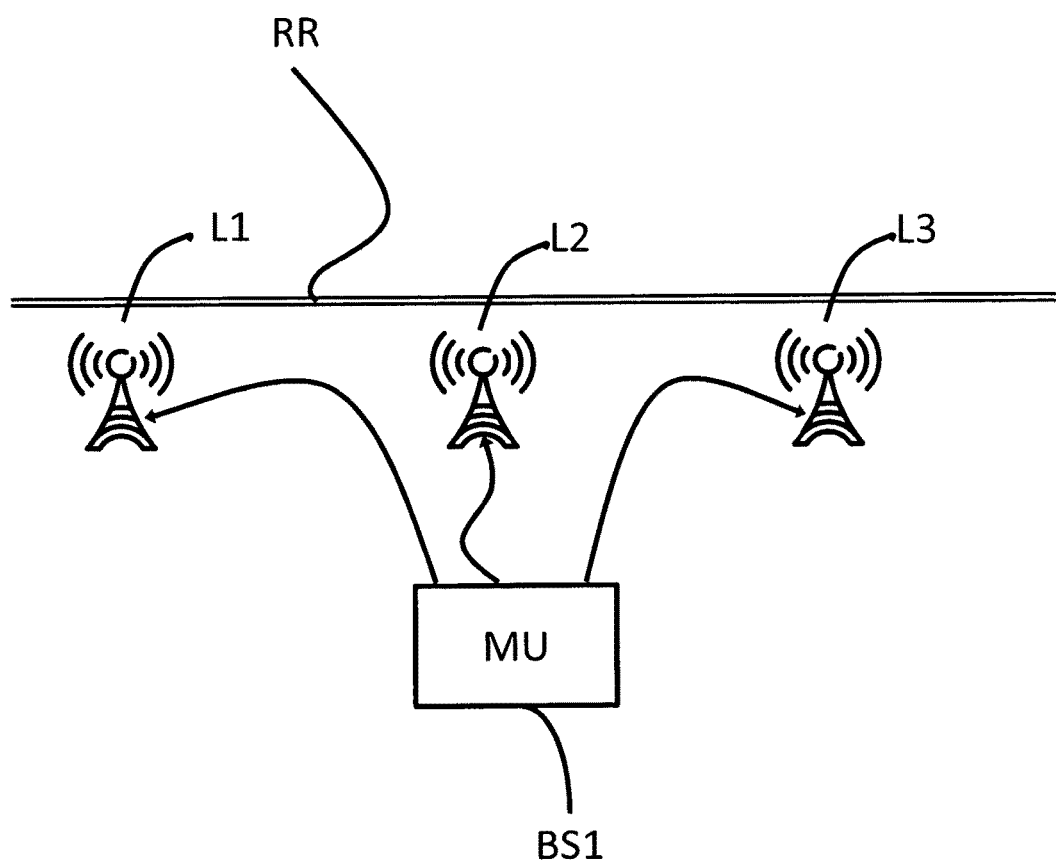
FIG. 3 depicts a further use case of a combined cell scenario.

Another example of a combined cell scenario is depicted in FIG. 3. Here, an example for a high mobility scenario, like along a railway track RR, highway or the like is shown. A number of RRUs L1, L2, L3, belonging to a single combined cell, is deployed along railway track RR in order to provide coverage for passengers on passing trains and avoid frequent cell handovers. RRUs L1, L2, L3 are under control of a master unit BS1 which in this scenario has no own radio head directly thereon.

Both the co-channel and the combined cell are currently being discussed in 3GPP, and several possible standard changes are being discussed; see 3GPP TR 25.800, "Technical report: Study on UMTS heterogeneous networks", v 2.0.0 for a summary of the current status.

Main use cases for combined cell include, but are not limited to:
  RRU combined with macro sector to cover blind spots or outdoor hot spots near macro as shown in FIG. 2.
  Coverage limited scenarios, for example high mobility scenarios like railways (as shown in FIG. 3) and in-building scenario with DAS (Distributed Antenna System) cell split.
  Special deployment scenarios, such as highway, railroad, indoor, arena, etc.
  To provide operators with an easily maintained heterogeneous network, with reduced UL/DL imbalance issues, and more robust mobility handling. As the penetration of UEs supporting SR increases, the capacity becomes closer to the co-channel deployment.

The advantages of combined cell compared to co-channel include, but are not limited to having fewer cells in one RNC, which is advantageous for OSS, requiring less mobility signalling, keeping neighbour cell relations, enabling smooth cell split if traffic increases, and reducing problems due to UL/DL power imbalance.

In the most basic combined cell approach all physical channels are transmitted from all antennas. This mode is referred to as Single Frequency Network (SFN) and this is the basic mode of operation.

More sophisticated modes are possible when additional pilots are added. These additional pilots are generally referred to as node selection pilots and demodulation pilots. The latter pilots are needed for channel estimation and demodulation, and can be defined in many ways, for example, UE specific or port(s) specific, and they can be transmitted either continuously or discontinuously (when needed). The node or port selection can also be facilitated in many ways. For example, continuously node or port specific demodulation pilots can be used, new probing pilots that are e.g. port(s) specific, or UE specific can be used. Some exemplary solutions can be found in 3GPP TR 25.800, "Technical report: Study on UMTS heterogeneous networks", v 2.0.0. With the additional pilots, spatial reuse (SR) mode where different nodes (antennas/ports) transmit different pilots and data can be used.

There may be two types of user equipments (UE), a first type which is capable of providing measurements and/or signalling that is specific and intended to be used for port selection, and a second type that is not capable thereof.

Said first type of UEs may relate to UEs supporting the above pilots for spatial reuse or node/port selective pilots. These UEs support new SR enabling features, such as demodulation pilots and/or node/port selection pilots. Within this document one may refer to the first type of UE as further specialized or developed or evolved UEs. As it is currently under discussion within 3GPP whether this kind of functionality will be included in Rel-12, for the scope of this document, they may also be referred to as Rel-12 UEs, although Rel-12 has not been finalized yet and it may be that such functionality will only be specified in a later release such as Rel-13 or beyond.

Said second type may relate to UEs that do not support the spatial reuse mode or above pilots. Such. UEs may not support that different nodes of a combined cell transmit different pilots. Examples of such UEs are at least pre-Rel-12 UEs as in these Releases the above discussed functionality has not been specified. These UEs may be referred to as legacy UEs.

Even for legacy UEs, who are not aware of the new pilots, SR type of operation, where different nodes or ports within the combined cell simultaneously transmit data to different UEs, can be employed. This requires careful coordination of both node resp. port selection (which nodes/ports that transmit to a specific UE) and scheduling (which UEs that can be scheduled simultaneously).

In a combined cell nodes or ports are to be selected that transmit pilots or data to certain UEs in the combined cell. In this way spatial reuse in a combined cell can be achieved. Within the cell there might be both legacy UEs and evolved UEs supporting certain spatial reuse functionality such as node selective pilots in a combined cell.

There are several transmission ports in one combined cell. The CPICH and common control channels are generally transmitted from all ports in a SFN manner in order to preserve coverage and to support legacy UEs. Similarly, legacy UEs rely in general on SFN transmission for dedicated resources, e.g. HS-PDSCH. Rel-12 UEs can, however, use a subset of available ports and thereby allow for spatial reuse (SR) by scheduling different users simultaneously from different transmission ports. To facilitate this approach 3GPP is currently discussing to introduce node selection features (e.g. probing pilots) and/or demodulation pilots that are transmitted from each port, or a subset of ports.

It turns out that also legacy users can exhibit SR gains by simultaneously scheduling more than one user from different transmission ports. In case of SR operation for legacy users, there are additional challenges since these UEs cannot benefit from the Rel-12 node selection features and/or demodulation pilots. This means that node selection must be carried out without the help of new node selection functionality, e.g. probing pilots. This implies that there is a risk of a channel mismatch since the channel estimation is based on the CPICH which is transmitted from all nodes in the combined cell, while dedicated user data may be transmitted only from a subset of these nodes. Increasing the number of ports for transmission will decrease the losses due to channel mismatch but it will also decrease the potential SR gains.

Since users in general are served by several ports, the downlink signal quality can be improved compared to co-channel. At the same time only ports that are contributing, i.e. have reasonably high signal strength at the receiving user should be transmitting dedicated data, in order to save power and not creating unnecessary interference.

When selecting the transmitting ports for the specific UE, the number of used ports has a large impact on the system performance. In general, if fewer ports are selected for transmission, the power consumption and inter-cell interference can be lower and/or more users can be scheduled simultaneously in one combined cell and thereby increasing the spatial reuse gains. However, the downlink signal quality for the specific UE might decrease. If more ports are selected for transmission, the downlink signal quality for the specific UE will be improved. However, the inter-cell interference will increase, and/or spatial reuse gains become lower since fewer users can be simultaneously scheduled in one combined cell.

Proper node selection functionality is essential for good performance in a combined cell. In particular, it is most crucial for legacy users that cannot rely on Rel-12 standardized node selection features.

Accordingly, and as mentioned above, there is provided a method for assigning ports of a cell of a radio access network to user equipments being attached to this cell, wherein one or more ports to be assigned to a user equipment are selected based on a traffic situation in said cell.

Herein, the term "port" is used to denote a facility by which a radio communication with a user equipment can be established in a cell. Thus, a port may be represented by a radio access node, like a radio base station, NodeB or eNodeB, or the like, by one or more physical antenna heads, remote radio unit(s) (RRU) or the like, or any combination thereof. For example, one port may comprise a combination of two or more radio access nodes or RRUs in a cell. As another example, a port may comprise a combination of physical antennas combined with a static or dynamic common precoder; such combination may also be denoted as virtual antenna, e.g. in the context of MIMO transmission.

Assigning one or more ports to a user equipment means that via assigned port(s) the radio access network may communicate with the user equipment, for example in a bi-directional fashion, and particularly for downlink transmission. This may include establishing signalling between the radio access network and the user equipment.

Said cell of the radio access network may be a so-called combined cell, i.e. the cell may comprise a plurality of radio access nodes and/or RRUs which share a common cell identity.

Further, the term "user equipment" generally encompasses any device which is able to establish communication with a radio access network, for example with a radio base station thereof, by transmitting and/or receiving radio signals. A user equipment may specifically be a mobile device like a mobile phone, PDA, portable computer like a laptop or tablet, portable media player or the like. However, in this context a user equipment may also be represented by a stationary or mobile wireless device for machine-to-machine communication, an integrated or embedded wireless card, an externally plugged in wireless card, etc.

Said traffic situation may be determined based on measurements, said measurements being performed by a node of the radio access network or by one or more user equipments and reported to the radio access network by the one or more user equipments. Then, the selection of the port(s) to be assigned to user equipments can be based on said measurements indicating the traffic situation within said cell.

Evaluation rules or criteria, for example one or more threshold(s), for such measurements may be defined, and selection of one or more ports to be assigned to a user equipment may be made depending on whether these evaluation rules or criteria are met, for example whether one or more threshold(s) are exceeded or underrun. Further, these thresholds resp. evaluation rules or criteria may be determined or adapted depending on the traffic situation, for example based on the load, and/or depending on the number, type, and/or position of user equipments within the cell, as will be further detailed below.

As already mentioned above, it is in this context conceivable that there exist two types of user equipments: A first type of user equipments may be capable of providing measurements and/or signalling that is specific and intended to be used for port selection, and a second type of user equipments may not be capable thereof, and for example may only be capable of providing more generic measurements and/or signalling which is not designed or intended to be used for port selection. For example, the first and second types of user equipments may operate according to different versions of a wireless communication standard, for example according to different releases of the 3GPP UMTS resp. WCDMA standard.

In such a case, said port selection may be made dependent on the relation of user equipments of the first and second types within the cell. For example, the above thresholds resp. evaluation rules or criteria may be adapted based on this relation.

A configuration or parameters for port selection may be determined, and signalled depending on which entity determines the configuration and which entity or entities use or apply the configuration. Said configuration resp. said parameters may correspond to the above-mentioned determination or adaptation of evaluation rules or criteria. The entity determining the configuration may for example be a control node of the radio access network, e.g. an RNC, or a radio access node, e.g. a NodeB or eNodeB, and the entity using or applying it may be a radio access node or a UE. Generally, if the entity determining the configuration is also using or applying it, no signalling is required, while signalling may be provided if the entity using or applying the configuration is different from the entity that has determined it.

Apparently, the above method may comprise assigning ports of the cell to a plurality of user equipments being attached to the cell.

In the above method, each of the one or more ports may comprise or be constituted by at least one radio unit, particularly remote radio unit, antenna head and/or radio access node.

Further, there is provided a network node, specifically a radio access node, for example a NodeB or eNodeB, which is capable of performing the above method. Said radio access node may comprise a plurality of radio units, particularly comprising remote radio units, a processor and memory, and may be capable of setting up a cell of a radio access network and assigning said radio units to user equipments being attached to this cell, wherein one or more radio units to be assigned to a user equipment are selected based on a traffic situation in said cell. Said assignment may be performed by the processor, for example by executing a program stored on said memory. Said processor may be any type of general purpose or special purpose processor, or may comprise a combination of more than one such processor. Said memory may be any type of magnetic, optical or electronic storage medium like harddisk, DVD, CD-ROM, semiconductor memory like flash memory, RAM, ROM or the like.

Further, there is provided a control node of a radio access network, for example a Radio Network Controller (RNC), being capable of determining parameters or a configuration for selecting ports of a cell of the radio access network to be assigned to user equipments attached to said cell, and of transmitting said parameters or configuration to a second network node of the radio access network, wherein said parameters or configuration relate(s) to evaluation of a traffic situation in said cell. Again, said control node may comprise a processor and memory, and said determining may be performed by the processor, for example by executing a program stored on said memory. Said processor may be any type of general purpose or special purpose processor, or may comprise a combination of more than one such processor. Said memory may be any type of magnetic, optical or electronic storage medium like harddisk, DVD, CD-ROM, semiconductor memory like flash memory, RAM, ROM or the like.

Further, there is provided a system for assigning ports of a cell of a radio access network to user equipments being attached to this cell, said system comprising a plurality of ports and being capable of assigning one or more ports to a user equipment, wherein said ports are selected based on a traffic situation in said cell. Said system may comprise a plurality of radio access nodes and/or radio units, particularly remote radio units, by which a cell of a radio access network is set up. For example, said radio access node(s) may be of the type described above.

Specifically, the system may comprise a network node resp. radio access node and/or control node as described above.

Further, there is provided computer program code, which, when executed by a processor, causes said processor to perform the above method, and a carrier comprising said computer program code. Said carrier may be any type of volatile or non-volatile carrier, like an electromagnetic or acoustic wave, magnetic, optical or electronic storage medium like harddisk, DVD, CD-ROM, semiconductor memory like flash memory, RAM, ROM or the like.

Figure 4:
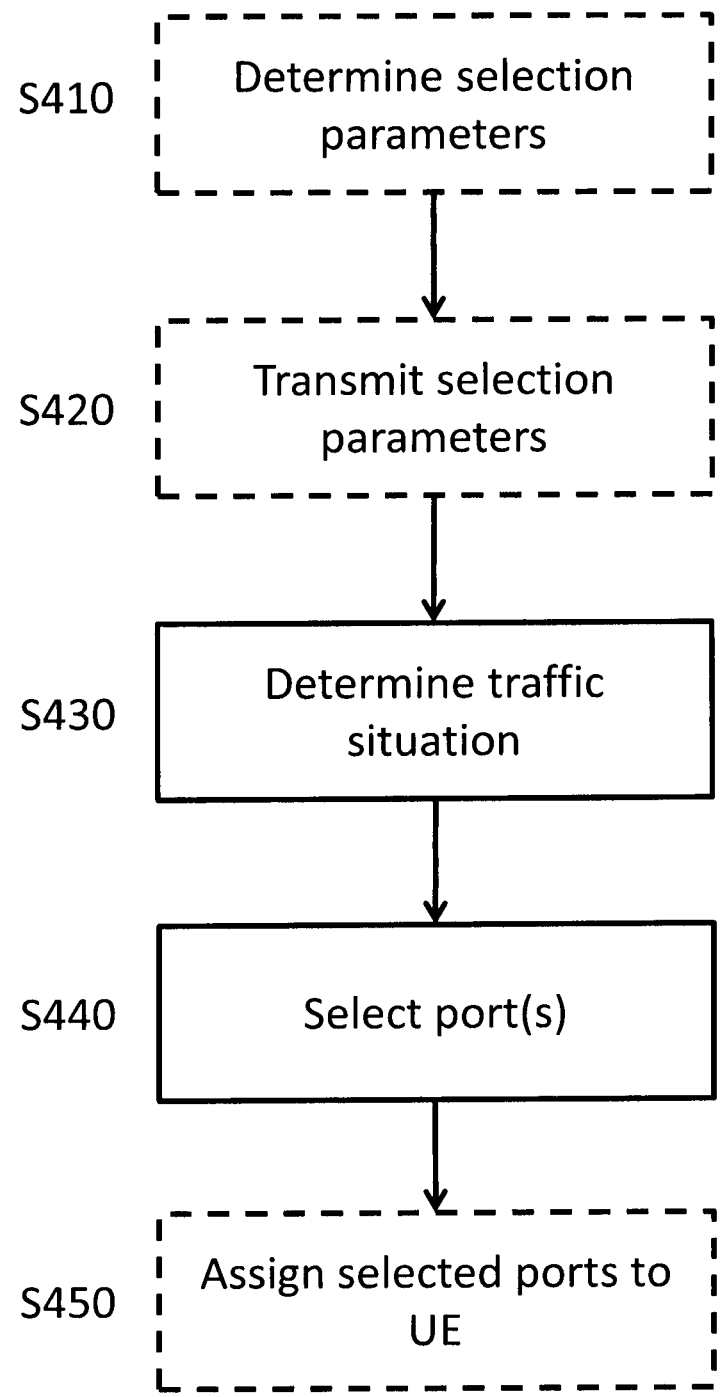
FIG. 4 is a flowchart of a method for port selection.

FIG. 4 is a flowchart of a method for selection of port(s) to be assigned to a user equipment in a cell of a radio access network.

In an optional step S410, selection parameters for port selection are determined. These parameters may for instance comprise evaluation rules or criteria, like threshold values, that can be applied to evaluate the traffic situation in the cell, for example measurements reflecting the traffic situation. This determination may be performed by the network node that will also perform the actual selection, like a radio access node of the radio access network, e.g. a NodeB or eNodeB, or by a node that will not perform the actual selection, like a control node of the radio access network, e.g. a RNC.

If the determination in step S410 is performed by a network node that will not perform the actual selection, the determined parameters will be transmitted in step S420 to the node that will actually perform the selection.

In step S430, the traffic situation is determined. This can be accomplished e.g. based on measurements performed by a radio access node, e.g. the radio access node that performs the selection, or by measurements performed by user equipments in the cell that are reported to the radio access node. In the course of this determination, the above-mentioned parameters may be applied, e.g. for evaluating said measurements Based on the traffic situation, in step S440 one or more ports to be assigned to a user equipment are selected.

More detailed examples of determination or evaluation of the traffic situation and selection of ports to be assigned will be given further below.

Finally, in step S450, the selected ports may be assigned to the user equipment.

Figure 5:
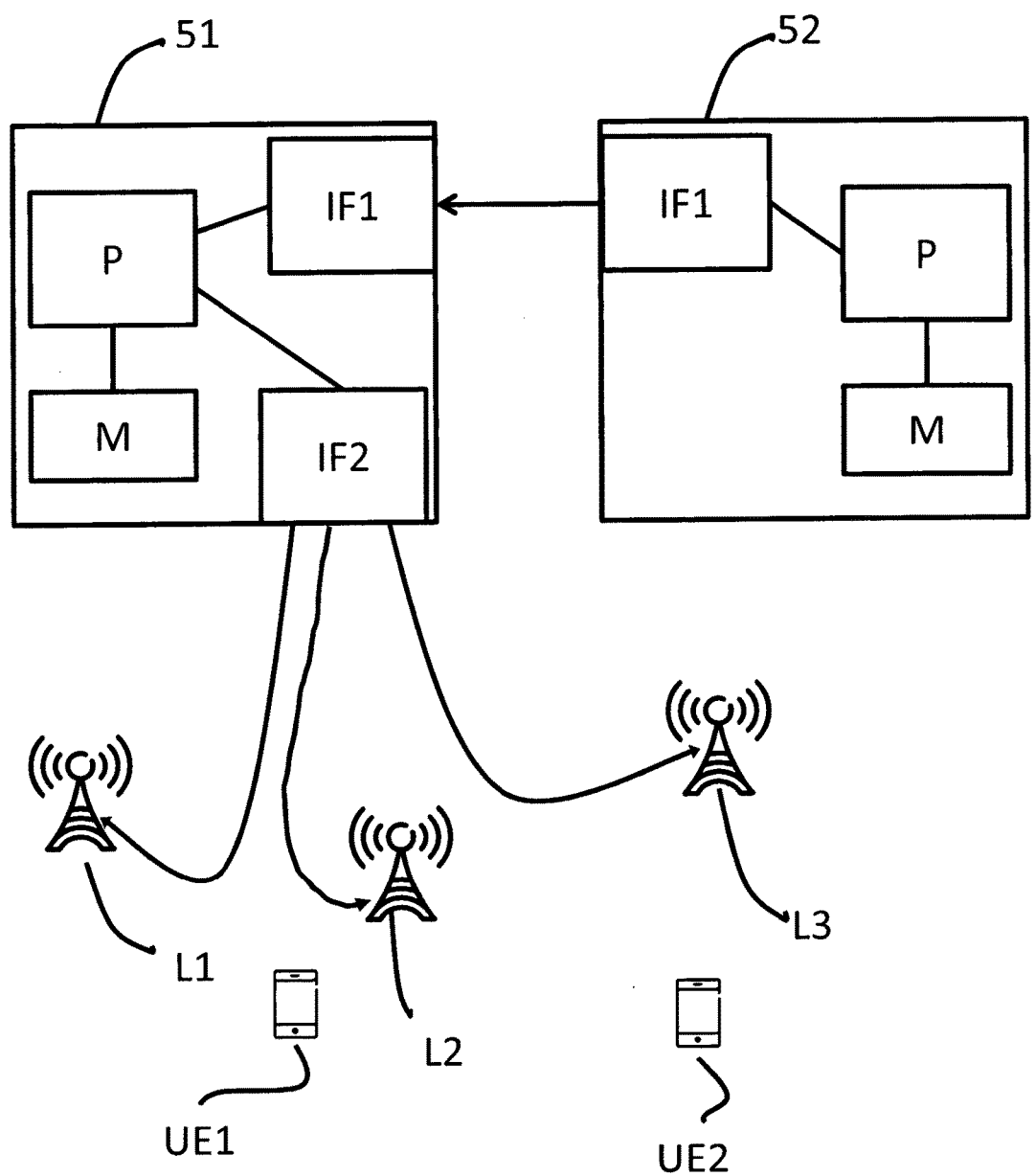
FIG. 5 depicts a system for port selection.

FIG. 5 depicts a system for port selection in which the method of FIG. 4 may be employed. The system comprises a radio access node 51 and a control node 52, which may correspond to the network node resp. radio access node and control node described above. Particularly, radio access node 51 may correspond to a NB or eNB and control node 52 may correspond to an RNC.

Both, radio access node 51 and control node 52, comprise a processor P, which may be any type of general purpose or special purpose processor, or may comprise a combination of more than one such processor, and a memory M which may be any type of magnetic, optical or electronic storage medium like harddisk, DVD, CD-ROM, semiconductor memory like flash memory, RAM, ROM or the like. Said processors P may be capable of executing programs stored in memories M and thereby performing the methods as described above and further below.

Further, radio access node 51 and control node 52 comprise a first interface IF1 over which they are connected and can communicate. Particularly, control node 52 may transmit parameters or configuration information to be used in evaluation of the traffic situation and/or in port selection to radio access node 51.

The system depicted in FIG. 5 further comprises RRUs L1, L2, L3 which are connected to radio access node 51 via interface IF2 of radio access node 51. Thereby, radio access node 51 may transmit port assignment information regarding user equipment UE1 and UE2, which are attached to the cell served by radio access node 51, to RRUs L1, L2 and L3. In this context, RRUs L1, L2 and L3 are examples for ports which may be assigned to user equipments, and may or may not be considered part of radio access node 51. However it is, as mentioned above, also conceivable that one or more ports comprise more than one RRU, or comprise one or more radio access nodes of the type of radio access node 51, or generally an arbitrary antenna arrangement.

In the following, methods to adapt the port selection algorithms according to the traffic situation (load), and fraction of legacy UEs/Rel-12 UEs in order to optimize the system performance, which may be employed in the method described the context of FIGS. 4 and 5 are described. Furthermore, approaches to adjust the configuration for port selection to optimize the system performance when the traffic load changes in the cell are disclosed. In particular, signalling of configuration for port selection, e.g. RNC/Node B based signalling to notify the UE regarding the configurations for port selection is addressed.

Information to base the node selection on includes, but is not limited to:
- Uplink path loss measurements;
- UE measurement reports;
- Positioning data, e.g. GPS;
- Scenario constraints, e.g. for highway, railroad, or indoor cases, the area where a user can be located is generally restricted which can be incorporated in the selection algorithm
- Pre-determined information. One example would be to pre-determine an average CQI map over the combined cell area for typical UE receiver types.

The path gain can be based on the UL DPCCH measured at each port. This information is available for all user equipments (including legacy user equipments). UE measurement reports for node selection are mainly available for Release 12 UEs. These reports consist of Rel-12 standardized node selection features, e.g. probing pilots or UE specific pilots. However, some UE reports, e.g. CQI, can potentially be used for node selection as well and would be applicable to legacy users. Node selection can also be based on positioning information, e.g. GPS, where coordinates are converted to power, scenario constraints or some pre-determined node selection information. Also, a combination of different node selection features can be used to obtain the final node selection (e.g. UL and/or DL path gain estimates). Here one can, for example, take the accuracy in each information element into consideration, and e.g. put more trust in reliable information and less trust in less reliable information by having different weights for different information. It should also be noted that UE measurements are generally based on e.g. CPICH and corresponds to the DL path loss (or received power at the UE), whereas UL DPCCH based measurements give an estimate of UL path loss. Typically one is interested in the DL path loss (or the DL receive power at the UEs) and therefore when using these measurements one needs to account for transmit power differences for different nodes when converting from UL path loss to DL path loss. Also, in a (dual-band) multicarrier setting, one cannot immediately rely on reciprocity between UL and DL, i.e. one need to account for frequency dependence in the path loss as well. This factor can be estimated and pre-compute by knowing the frequency bands.

Next follow some examples of port selection algorithms. The path gain from a transmission node or port i to the UE of interest is denoted by $PG_i$, which may for example be measured in dB. The path gain refers to DL path gain, so if UL path loss is measured, it is converted to DL path gain by considering all factors mentioned above, e.g. different transmission power for different nodes, carrier frequency, etc.

According to selection method 1, if $PG_i > \text{thr}\_1$, the i th port can be used for downlink transmission. I.e., if the path gain between a certain port and the user equipment exceeds a certain threshold, this port can be assigned to the user equipment.

According to selection method 2, if $$PG_i > \max_j(PG_j) + \text{thr}\_2,$$

$j \neq i$, the i th port can be used for downlink transmission, i.e. if the path gain between a certain port and the user equipment exceeds the maximum path gain for all other ports plus a certain threshold, this port can be assigned to the user equipment.

According to selection method 3, the $PG_i$ are sorted in increasing order; then, without loss of generality, $PG_i > PG_{i+1}$ can be assumed for all i. Now, if $$\frac{PG_i}{\sum_{j=0}^{i-1} PG_j} > \text{thr}\_3,$$

the i th port can be used for downlink transmission, i.e. if the relation of path gain between a certain port and the user equipment to the sum of the path gains of all other ports exceeds a certain threshold, this port can be assigned to the user equipment. In this case, the path gains $PG_i$, $PG_j$ represent path gains in linear scale.

These examples do only consider the path gain, and assumes that each UE needs one transmission port. In general the path gain can be a combination of many measures as discussed above. Also, in many cases, one UE will be served by more than one port. For example, if SR should be employed for legacy users, then the isolation between the links (transmission ports) to different user equipments needs to be sufficiently large to minimize the channel mismatch issue. Furthermore, a Rel-12 UE employing some advanced beamforming schemed will use more than one port and weight the signal from each port to achieve coherent combining at the receiver, or a beam.

In the following, the port selection configuration based on traffic load and UE type is described.

Figure 6:
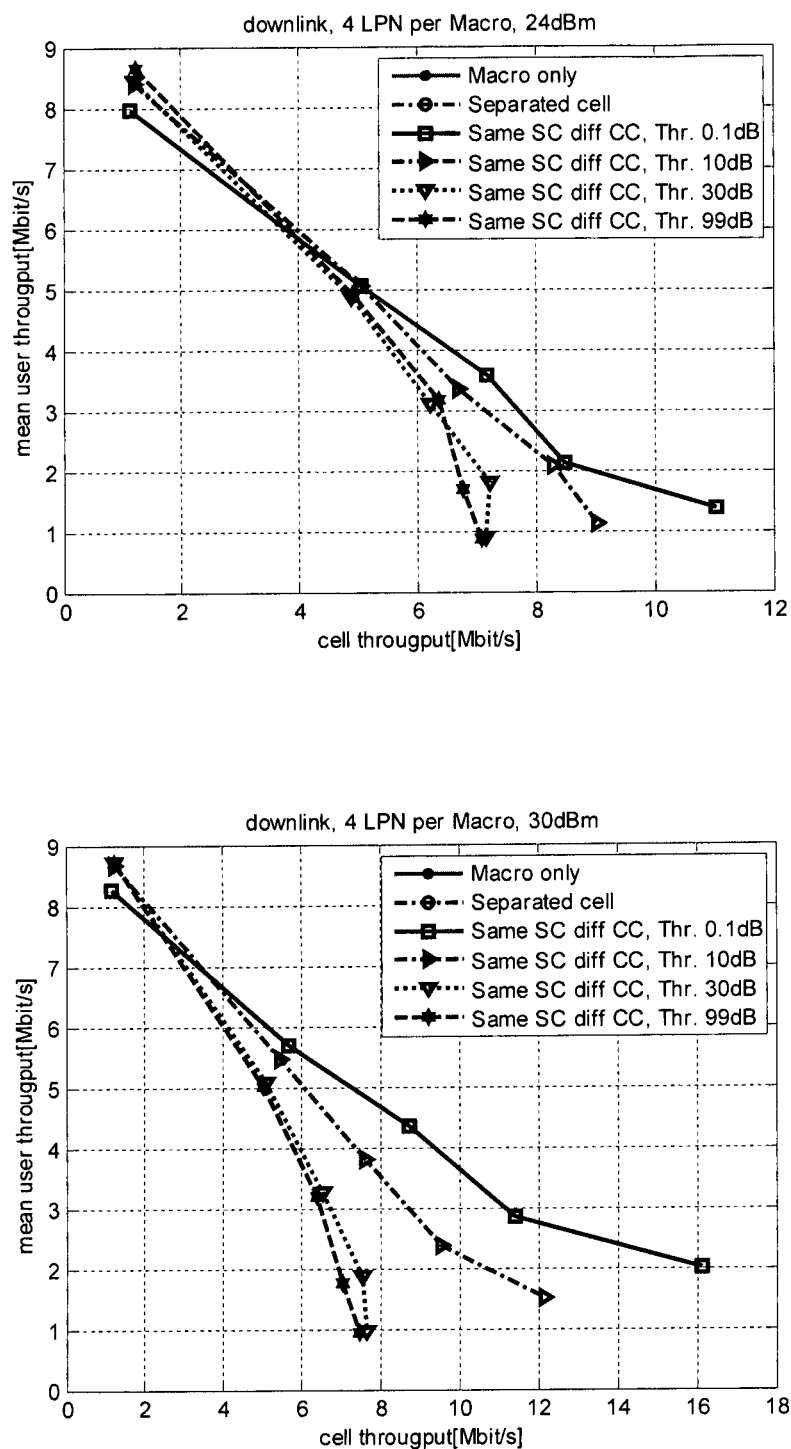
FIG. 6 shows two diagrams depicting user throughput vs. cell throughput depending on different thresholds.

In FIG. 6, the system performance with different thresholds (based on port selection method 2 listed above) is shown. It can be observed that the optimized threshold can be different depending on the load.

According to this embodiment, the following metrics can be used to tradeoff the gain of the specific scheduled UE and system performance.

The load ($N_{intra}$) in the combined cell is the number of users with active or potential active downlink traffic in the combined cell. The load ($N_{intra}$) can also take into account the traffic type of the users in the combined cell. For example, a few "full buffer" (e.g. downloading content, high bit-rate streaming, etc) users can give a higher load than a large amount of "chatty" (e.g. web surfing) users.

The load ($N_{inter}$) in the neighbor cell is the number of users with active or potential active downlink traffic in the neighbor cell. Also the load ($N_{inter}$) can take into account the traffic type of the users.

If the $N_{intra}$ or $N_{inter}$ is smaller than N_thr, the port selection thresholds (thr_1, thr_2 or thr_3, etc.) can take a small value. If $N_{intra}$ or $N_{inter}$ is greater than N_thr, the thresholds (thr_1, thr_2 or thr_3, etc.) can have a larger value.

The thresholds can also be different depending on the mix of legacy UEs and Release 12 UEs. Since legacy UEs suffer from the channel mismatch problem, this may affect the optimal threshold. For legacy users, having a small value of the threshold will limit the difference between the estimated channel from the CPICH and the effective channel from the transmitting ports, hence limiting the channel mismatch. It is possible to use separate thresholds for legacy UEs and Release 12 UEs or a combined threshold, taking into account the current mix of legacy UEs in the combined cell or system.

When the load is not high and/or the fraction of legacy UEs is high, more ports can be selected with the small threshold, which can improve the scheduled UE performance.

When the load is high and/or the fraction of legacy UEs is low, fewer ports can be selected with the large threshold, which can improve spatial reuse gain.

In the following, the signalling of configuration for port selection is described.

The configuration of port selection used in the port selection algorithm can be located in Node B and/or UE.

The configuration can be decided in RNC and/or Node B. If the configuration is decided in Node B, and the configuration is also used in Node B, there is no need of signalling of configuration. If the configuration is decided in RNC, and the configuration is used in Node B and/or UE, there is need of signalling of configuration. If the configuration is decided in Node B, and the configuration is used in UE, there is also need of signalling of configuration.

This embodiment includes the RNC/Node B based signalling (e.g. higher layer RLC/L2 signalling or L1 signalling, e.g. HS-SCCH orders) to notify the Node B/UE regarding the configurations for port selection. The configuration can be, for example, thresholds that should be used for port selection It has to be noted that this disclosure primarily addresses SIMO (Single Input, Multiple Output) operation, but it is applicable to MIMO (Multiple Input, Multiple Output) operations as well. For example, in addition to the P-CPICH there might be one or more S-CPICH available for channel estimation purposes. Throughout this disclosure, the term CPICH refers to the P-CPICH unless otherwise stated. Further note that the document is in most places referring to WCDMA/HSPA systems, but techniques as described herein can be applied in other systems, e.g. LTE, as well.

Generally, several modifications will be apparent to and can be readily made by the skilled in the art without departing from the scope of the present invention.

By means of the above-described measures, user and system performance in downlink is improved with the proposed port selection which takes into account traffic load and distribution, fraction of legacy users and network layout.

ABBREVIATIONS USED THROUGHOUT THIS DOCUMENT

KPI Key Performance Index (Indicator)
GPS Global Positioning System
DAS Distributed Antenna System
DPCCH Dedicated Physical Control Channel
HS-DPCCH Dedicated Physical Control Channel for HS-DSCH
CQI Channel Quality Indicator
OSS Operations Support Systems
SFN Single-Frequency Network
SR Spatial Reuse
SIMO Single input multiple output
MIMO Multiple input multiple output
HSDPA High Speed Downlink Packet Access
HSPA High Speed Packet Access
HS-SCCH High speed shared control channel
HS-PDSCH High speed Physical data shared channel
HARQ Hybrid automatic repeat request
UE User Equipment
TTI Transmit Time Interval
PCI Precoding control index
Tx Transmitter
LPN Low Power Node
RRU Remote Radio Unit
RNC Radio Network Controller
DL Downlink
WCDMA Wideband Code Division Multiple Access
3GPP 3rd Generation Partnership Project
CPICH Common Pilot Channel
P-CPICHPrimary CPICH
S-CPICHSecondary CPICH

The invention claimed is:

1. A method for assigning ports of a cell of a radio access network to user equipments being attached to the cell, the method comprising:
    determining a traffic situation in said cell, wherein the traffic situation is determined based on measurements, said measurements being performed by a node of the radio access network or by one or more user equipments and reported to the radio access network by the one or more user equipments;
    selecting one or more ports of said cell based on the determined traffic situation in said cell, wherein the cell comprises a plurality of radio access nodes and/or remote radio units which share a common cell identity; and
    assigning the selected one or more ports of the cell to one of the user equipments, wherein user equipments of a first type and of a second type are present in the cell, said first and second type differing from each other in their capabilities to perform measurements, and wherein said port selection is made dependent on the relation of user equipments of the first and second types within the cell.

2. The method according to claim 1, further comprising determining evaluation rules defining one or more threshold values for use in said measurements, and performing said selecting one or more ports depending on whether said one or more thresholds are exceeded or underrun.

3. The method according to claim 2, wherein said one or more thresholds are determined or adapted depending on the determined traffic situation and/or depending on the number, type, and/or position of user equipments within the cell.

4. The method according to claim 1, further comprising determining, by a first entity in the radio access network, parameters for selecting ports to be assigned, transmitting said parameters to a second entity in the radio access network and selecting, by the second entity, one or more ports to be assigned to the user equipment, wherein said parameters are applied.

5. The method according to claim 4, wherein the first entity is a control node of the radio access network, and the second entity is a radio access node of the radio access network.

6. The method according to claim 4, wherein said parameters comprise evaluation rules defining one or more threshold values used for measurements of the traffic situation in said cell.

7. The method according to claim 1, further comprising assigning a plurality of selected ports of said cell to a plurality of the user equipments attached to said cell.

8. The method according to claim 1, wherein each of the one or more ports comprises at least one radio unit, antenna head and/or radio access node.

9. A network node of a radio access network, comprising or being connected to a plurality of radio units, the network node comprising:
    at least one processor; and
    at least one memory coupled to the at least one processor that stores program code which when executed by the at least one processor causes the at least one processor to perform operations comprising:
        setting up a cell of the radio access network, wherein the cell comprises a plurality of radio access nodes and/or remote radio units which share a common cell identity;
        determining a traffic situation in said cell, wherein the traffic situation is determined based on measurements, said measurements being performed by a node of the radio access network or by one or more user equipments and reported to the radio access network by the one or more user equipments;
        selecting one or more radio units based on the determined traffic situation in said cell; and
        assigning the selected one or more radio units to user equipments being attached to said cell, wherein user equipments of a first type and of a second type are present in the cell, said first and second type differing from each other in their capabilities to perform measurements, and wherein said port selection is made dependent on the relation of user equipments of the first and second types within the cell.

10. The network node according to claim 9, wherein the plurality of radio units comprises remote radio units.

11. The network node according to claim 9, wherein the selecting one or more radio units further comprises selecting one or more ports of said cell, and wherein each of the one or more ports comprises or is constituted by at least one of said radio units.

12. A control node of a radio access network, the control node comprising:
    at least one processor; and
    at least one memory coupled to the at least one processor that stores program code which when executed by the at least one processor causes the at least one processor to perform operations comprising:
        determining, by a first entity in the radio access network, parameters for selecting ports of a cell of the radio access network to be assigned to user equipments attached to said cell;
        transmitting said parameters to a second entity of the radio access network, wherein said parameters relate to evaluation of a traffic situation in said cell; and
        selecting, by the second entity, one or more ports to be assigned to the user equipment, wherein said parameters are applied.

13. A system for assigning ports of a cell of a radio access network to user equipments being attached to this cell, said system comprising:
    a plurality of ports;
    at least one processor; and
    at least one memory coupled to the at least one processor that stores program code which when executed by the at least one processor causes the at least one processor to perform operations comprising:
        determining a traffic situation in said cell, wherein the traffic situation is determined based on measurements, said measurements being performed by a node of the radio access network or by one or more user equipments and reported to the radio access network by the one or more user equipments;
        selecting one or more radio units based on the determined traffic situation in said cell, wherein the cell comprises a plurality of radio access nodes and/or remote radio units which share a common cell identity; and
        assigning the selected one or more radio units to user equipments being attached to said cell, wherein user equipments of a first type and of a second type are present in the cell, said first and second type differing from each other in their capabilities to perform measurements, and wherein said port selection is made dependent on the relation of user equipments of the first and second types within the cell.

14. The system according to claim 13, wherein each of plurality of ports comprises or is constituted by at least one radio unit, antenna arrangement and/or radio access node.

15. The system according to claim 13, comprising a network node that contains the at least one processor and the at least one memory.

16. A computer program product comprising a non-transitory computer readable storage medium storing program code, which, when executed by one or more processors, causes said one or more processors to perform the method according to claim 1.

* * * * *